United States Patent [19]
Tuzson et al.

[11] 3,977,382
[45] Aug. 31, 1976

[54] FUEL REGULATOR

[75] Inventors: John J. Tuzson, Evanston; Irving H. Hallberg, Des Plaines, both of Ill.

[73] Assignee: Borg-Warner Corporation, Chicago, Ill.

[22] Filed: Sept. 15, 1975

[21] Appl. No.: 613,765

[52] U.S. Cl. .................. 123/139 AW; 123/119 R; 261/36 A; 137/88; 137/114
[51] Int. Cl. .......................................... F02m 7/12
[58] Field of Search .............. 261/36 A; 123/119 R, 123/139 AW; 137/88, 114

[56] References Cited
UNITED STATES PATENTS

| | | | |
|---|---|---|---|
| 2,165,447 | 7/1939 | Browne | 261/69 A |
| 2,706,976 | 4/1955 | Gianini | 261/36 A |
| 2,761,388 | 9/1956 | Peterson | 137/114 |
| 2,783,033 | 2/1957 | Halik | 261/36 A |
| 2,940,436 | 6/1960 | De Claire, Jr. et al. | 261/36 A |
| 3,039,485 | 6/1962 | Brohl | 261/36 A |
| 3,061,286 | 10/1962 | Mennesson | 261/36 A |
| 3,101,734 | 8/1963 | Replogle et al. | 137/114 |
| 3,187,732 | 6/1965 | Orner | 261/36 A |
| 3,785,627 | 1/1974 | Tuzson et al. | 261/36 A |
| 3,794,302 | 2/1974 | Diener | 261/36 A |
| 3,809,036 | 5/1974 | Knapp | 123/139 AW |
| 3,867,917 | 2/1975 | Zeyns et al. | 123/119 R |

OTHER PUBLICATIONS

"Hydraulic Control Systems", H. E. Merritt, John Wiley & Sons 1967, p. 331.

Primary Examiner—Tim R. Miles
Attorney, Agent, or Firm—Herman E. Smith

[57] ABSTRACT

A fuel system in which excess fuel is recirculated from the charge forming apparatus, including means for regulating pressure of the recirculated fuel which in turn influences the air-fuel ratio of the charge forming apparatus. One embodiment of the regulator includes manual adjusting means for maintaining a stable pressure and air-fuel ratio, while another embodiment includes an electronically controlled transducer for varying the pressure and air-fuel ratio while the engine is operating.

9 Claims, 4 Drawing Figures

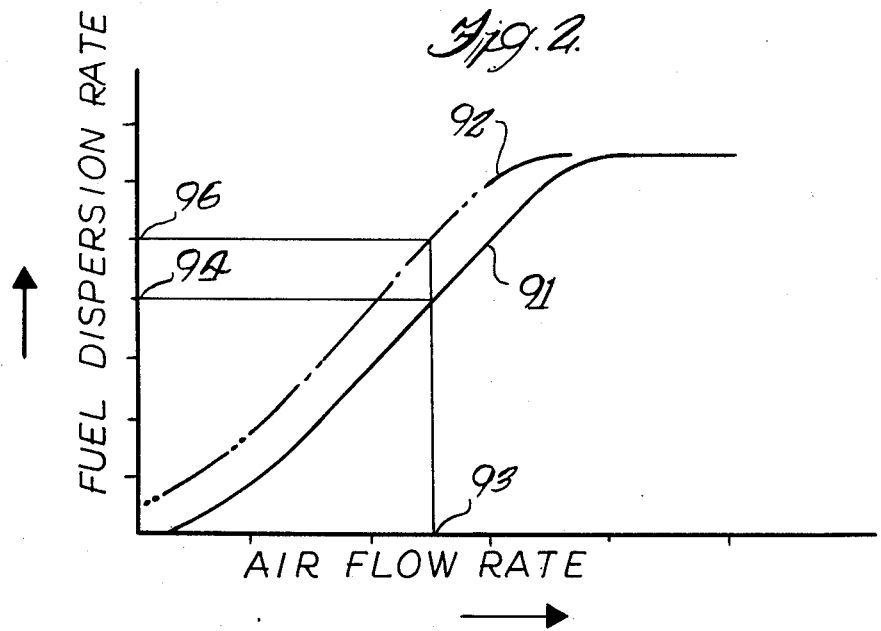
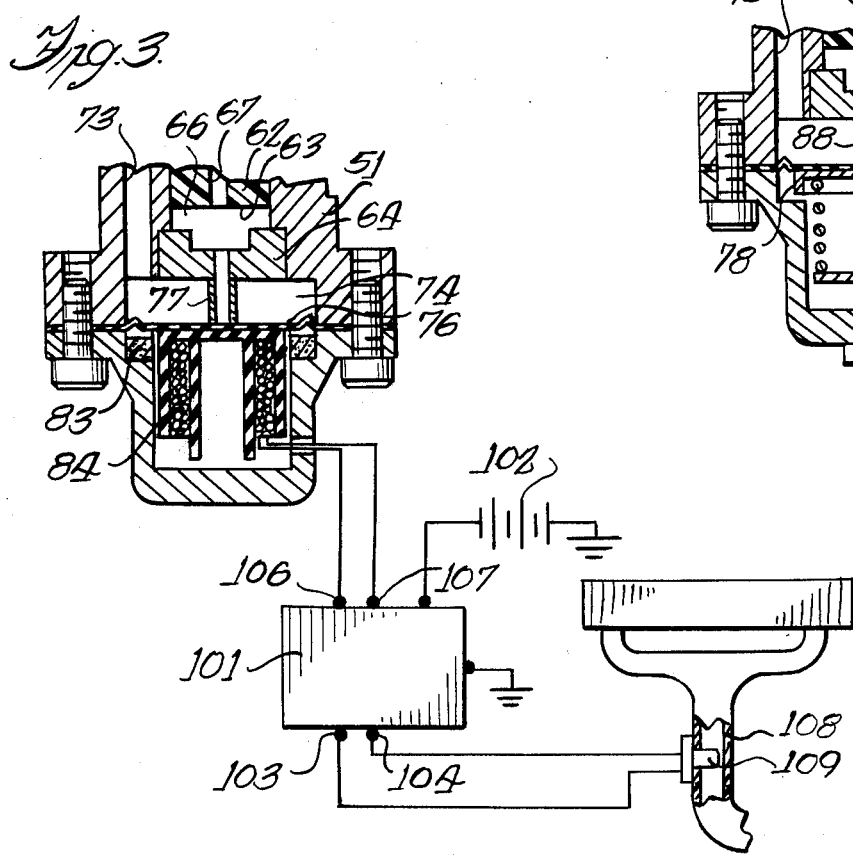

FUEL REGULATOR

BACKGROUND OF THE INVENTION

1. Field

The present invention relates to fuel regulators and more particularly to fuel regulators for use with charge forming apparatus in which excess fuel is recirculated.

2. Prior art

The prior art includes various examples of fuel injection and pressure carburetion in which fuel is supplied under pressure and excess fuel is returned. Devices can be employed for modifying the upstream or downstream pressure or both in accordance with a parameter indicative of fuel requirement such as manifold vacuum.

The prior art also includes charge forming apparatus as shown in U.S. Pat. No. 3,785,627 of a type in which excess fuel is returned and in which fuel is metered by means of the impact of the air stream on an open fuel channel. In U.S. Pat. No. 3,785,627, it is taught that the air-fuel ratio characteristic can be changed by changing the shape and/or size of the opening in the fuel channel. Plural fuel channel openings may be employed in order to achieve a desired air-fuel ratio over an extended range of engine operation. Changing the air-fuel ratio of such apparatus, employing plural channel openings, requires considerable care in adjusting the size or shape of one or more of the channel openings to achieve the desired result.

SUMMARY OF THE INVENTION

The present invention is directed to improvements in fuel regulators and more particularly to an improved regulator for use with charge forming apparatus in which excess fuel is returned.

In charge forming apparatus of the type shown in U.S. Pat. No. 3,785,627, it has been found that the back pressure, that is, the pressure of the recirculated excess fuel, influences the air-fuel ratio characteristic of a given fuel channel opening configuration. Currently, it is believed that the flow rate of excess fuel influences the back pressure of the recirculated fuel unless special measures are taken to prevent this such as by venting the return to ambient. The flow rate of excess fuel is in turn influenced by the amount of fuel displaced from the fuel channel. It is thought that the shape of the air-fuel ratio characteristic curve for a given fuel channel configuration is influenced by the back pressure of recirculated fuel, which therefore should be vented or regulated in order to control fuel dispersion from the channel.

The regulator of the present invention provides a variable flow area restriction which operates on an error signal principle for use with recirculated fuel. A desired reference pressure is selected, and any deviation from the selected reference pressure results in a change in flow restriction of recirculated fuel which in turn changes the flow rate in such a way that the back pressure is adjusted toward the value of the selected reference pressure.

Back pressure regulation is a desirable improvement in charge forming apparatus of the type shown in U.S. Pat. No. 3,785,627 in that it provides additional means for regulating the air-fuel ratio characteristic. Thus, where the back pressure regulator includes means for manually adjusting the selected reference pressure, the air-fuel ratio characteristic of the charge forming apparatus can be adjusted without disturbing the fuel channel opening configuration. In addition, where the back pressure regulator includes remotely operated transducer means for controlling the reference pressure, it is possible to change the air-fuel ratio while the engine is operating. Such capability is especially beneficial where it is desired to continuously vary the air-fuel ratio in accordance with the condition of an operating parameter of the engine such as a component in the exhaust system of an engine.

While the regulator of the present invention is useful in many pressure regulation systems, it is especially beneficial for use in regulating back pressure in charge forming apparatus of the type shown in U.S. Pat. No. 3,785,627 wherein fuel is metered from a fuel channel by the impact of incoming air.

BRIEF DESCRIPTION OF THE DRAWINGS

FIG. 2 shows an air-fuel characteristic curve typical of the system shown in FIG. 1;

FIG. 3 is a fragmentary view of a pressure regulator and control apparatus therefor; and FIG. 4 is a fragmentary view of an alternate embodiment of back pressure regulator.

DESCRIPTION OF THE PREFERRED EMBODIMENTS

Figure 1:
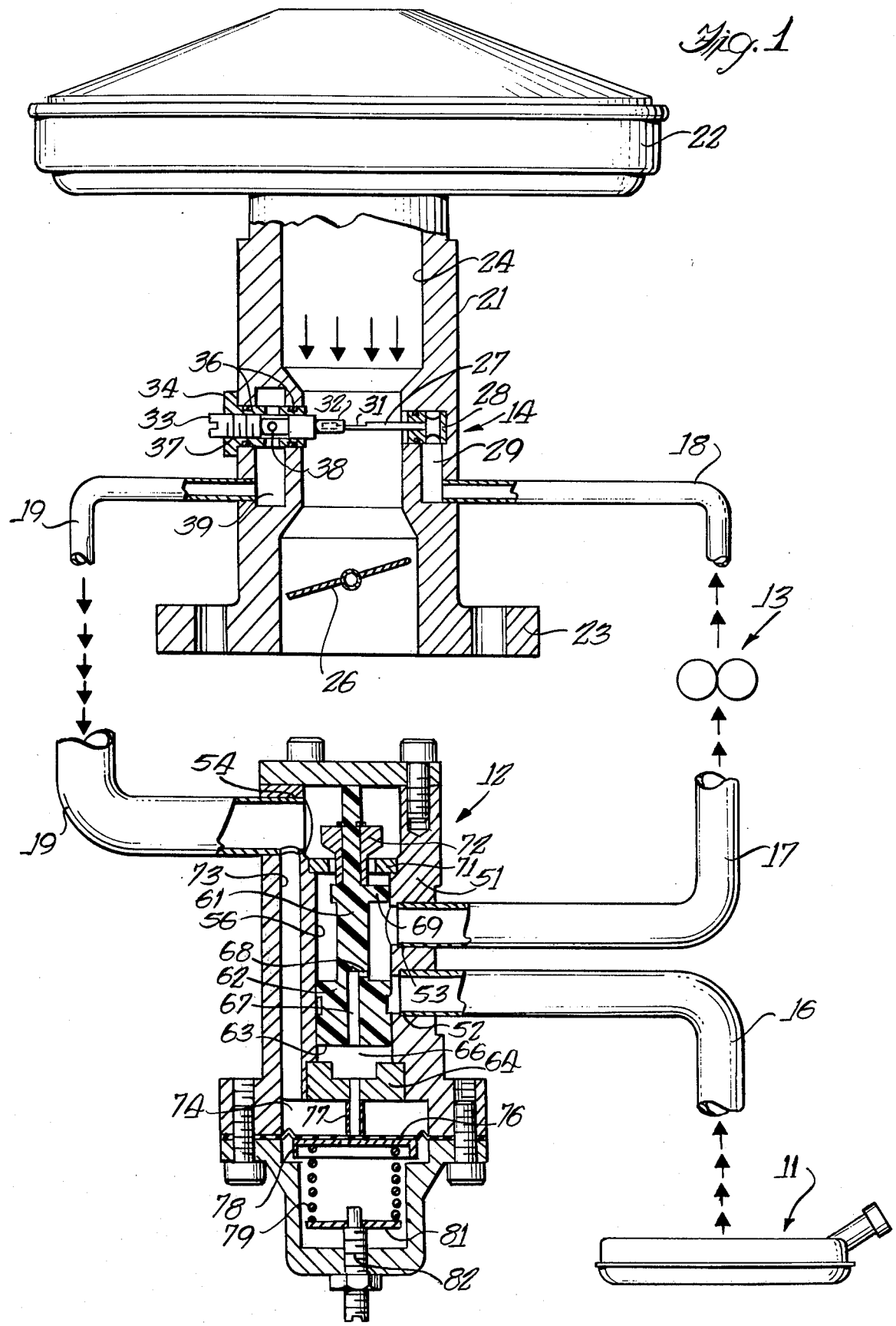
FIG. 1 shows a recirculating fuel system including a back pressure regulator according to the present invention.

Referring now in more detail to the drawings and particularly to FIG. 1, there is shown a fuel system including a fuel tank 11, a regulator 12, a pump 13 and charge forming apparatus 14 together with connecting conduits 16, 17, 18 and 19 arranged for recirculating excess fuel. The pump 13, fuel tank 11, and connecting conduits 16, 17, 18, 19 may be of conventional construction.

Charge forming apparatus 14 includes a body 21 having an air cleaner 22 mounted on one end and having a mounting flange 23 for mounting on the inlet manifold of an internal combustion engine. An air inlet passage 24 extends through body 21. A rotatable throttle plate 26 is mounted in air inlet passage 24 for controlling air flow through the charge forming apparatus. A hollow tube 27 is mounted in a fitting 28 to receive fuel from a cavity 29 formed in body 21. Tube 27 extends across air passage 24 and includes an opening 31 facing upstream so as to receive the impact of air flowing in the air passage. A second tube 32 receives tube 27 and is adjustably mounted in a fitting 33, 34 for adjustably masking a portion of opening 31. The fitting 33, 34 is provided with seals 36, threads 37, and apertures 38. The threads 37 provide means for adjusting the size of opening 31 while the seals 36 and apertures 38 provides for conducting excess fuel from tube 27 to the cavity 39 formed in body 21. The inlet cavity 29 is connected to conduit 18 and pump 13, while outlet cavity 39 is connected to regulator 12 by means of conduit 19.

Regulator 12 includes a body 51 having an inlet port 52, an outlet port 53 and a return port 54 arranged for communication with a control bore 56. A control spool 61 is slidably received within bore 56 and includes a land portion 62 arranged adjacent inlet port 52. An end face 63 of spool 61, and closure member 64 define a control chamber 66 in an end portion of bore 56. A passage 67 and orifice 68 extend from face 63 through land 62 of spool 61 to provide communication between control chamber 66 and outlet port 53.

The pressure range of recirculated fuel is in the order of from a few inches of liquid column to one or two pounds per square inch which results in weak forces for operation of the regulator. It is therefore desirable that friction between control spool 61 and bore 56 be kept low. To this end, the preferred embodiment of spool 61 is formed of a low friction plastic polymer known to have excellent antifriction properties, and fitted loosely in the bore 56. Further, the spool 61 may include radial fingers such as 69 spaced from land portion 62 and engaging bore 56 for maintaining the spool in axial alignment in the bore.

An orifice ring 71 is mounted in body 51 between outlet port 53 and return port 54. A tapered metering plug 72 is mounted on spool 61 for movement with respect to orifice ring 71, the plug 72 and ring 71 forming throttling means for variably restricting flow from return port 54 to outlet port 53. The annular area between plug 72 and ring 71 should be made as large as practicable in order to accommodate large return flow with low pressure drop when the regulator is fully open. An elongated passage 73 extends parallel to bore 56 providing communication between return port 54 and a lower cavity 74 in body 51. A flexible diaphragm 76 is secured to body 51 to define part of lower cavity 74. Diaphragm 76 is biased against a control port 77, formed in closure member 64, by means of a disc 78 and spring 79. An adjustable spring seat 81 engages an adjusting screw 82 by means of which the biasing force of diaphragm 76 on control port 77 is regulated. Diaphragm 76 and control port 77 cooperate to provide a pressure regulator controlling flow from lower cavity 74 to control chamber 66.

Inasmuch as the regulator is to operate on low pressure, say, less than two pounds per square inch and inasmuch as it is desired to approach constant pressure control, it is desirable to make the diaphragm 76 as large as practicable in order to open control port 77 in response to a small pressure difference. Furthermore, it is desirable that the spring 79 have a low spring rate, and be preloaded to the desired reference load since the force exerted by a soft spring changes very little with deflection, therefore allowing regulation near constant pressure. Where a voice coil is used for biasing the diaphragm, as shown in FIG. 3, the force exerted is substantially independent of displacement permitting even closer approach to constant pressure regulation.

An example of the operation of regulator 12 is as follows. Assume that adjusting screw 82 has been adjusted to select a value of a reference pressure for control chamber 66. Assume that the back pressure in return port 54, passage 73 and lower cavity 74 is sufficient to maintain diaphragm 74 away from control port 77 providing a flow area equal to the flow area of orifice 68.

Assume that control chamber 66 is charged with fluid from control port 77 at the same rate that fluid is exhausted through orifice 68 resulting in control spool 61 remaining stationary in bore 56. Since in such case the pressure in chamber 66 is half way between the pressures in return port 54 and outlet port 53, the valve bore 56 and the bore in orifice ring 71 have to be sized such that the pressure force acting on face 63 and the effective pressure force acting on the plug 72 should hold balance. For the purposes of this explanation it is assumed that equlibrium occurs when the flow passages at 77 and at 68 are equal; however, for different bore sizes equilibrium would occur for other proportions between areas 77 and 68.

When spool 61 is stationary in bore 56, metering plug 72 is stationary with respect to orifice ring 71 providing throttling or flow restriction between return port 54 and outlet port 53 which tends to stabilize the pressure in return port 54. If charge forming apparatus 14 withdraws additional fuel from opening 31, the lesser amount of recirculated fuel in conduit 19 results in a lower pressure in return port 54, passage 73 and lower cavity 74 such that diaphragm 76 reduces the flow area of control port 77, less than the area of orifice 68. When the flow area of control port 77 is less than the flow area of orifice 68, control chamber 66 is exhausted more rapidly than it is being charged, resulting in a reduction in control chamber volume which causes spool 61 to move toward closure member 64 carrying metering plug 72 closer to orifice ring 71. As metering plug 72 moves closer to orifice ring 71, the flow restriction between return port 54 and outlet port 53 is increased resulting in an increase in the back pressure in return port 54 toward the stable value of back pressure. As the back pressure increases toward the stable value, the pressure increase acts on diaphragm 76 to increase the flow area of control port 77 so that it approaches the flow area of orifice 68. When the flow area of control port 77 again becomes equal to the flow area of orifice 68, the flow into and out of control chamber 66 becomes equal which causes spool 61 to remain stationary in a new location in bore 56 providing a new throttling restriction at 71, 72 consistant with the flow of recirculated fuel from conduit 19. On the other hand, if the charge forming apparatus 14 withdraws less fuel from opening 31, more excess fuel is recirculated to conduit 19 resulting in a pressure rise in return port 54 and on diaphragm 76. A pressure rise on diaphragm 76 increases the flow area of control port 77 above that of orifice 68 thereby increasing the volume of control chamber 66 such that spool 61 moves away from closure member 64, and metering plug 72 moves away from orifice ring 71. As metering plug 72 moves away from orifice ring 71, the throttling restriction between return port 54 and outlet port 53 is reduced resulting in a pressure drop in return port 54 approaching the stable back pressure value.

The regulator serves as a junction for fuel lines 16, 17 and 19 which prevents pump suction fluctuations from disturbing the back pressure and which assures adequate fuel flow to the pump inlet from the tank and the recirculated fuel.

It is thought that the above brief description of the regulator is sufficient to provide an understanding of how the variable throttling means 71, 72 compensates flow rate from return port 54 in order to stabilize the back pressure on the charge forming apparatus.

Turning now to FIG. 2, there is shown a graph illustrating air-fuel flow characteristics typical of the charge forming apparatus 14 when back pressure regulation is provided by regulator 12. The air-fuel characteristic curve 91 would be typical of operation at a low value of reference pressure whereas the characteristic 92 would be typical of operationn at a higher value of reference pressure. For example, for a given flow rate of air such as indicated at 93, the characteristic curve 91 indicates a corresponding full dispersion rate as at 94. If the adjusting screw 82 of regulator 12 is turned to increase the reference pressure, the increase in stable back pressure on the charge forming apparatus results in a new characteristic curve such as 92 which provides an increase in fuel dispersion rate such as 96 for the same air flow rate 93. Thus manual adjustment of screw 82 is effective to select the reference pressures of the regulator which in turn determines the back pressure on the charge forming apparatus which in turn determines the air-fuel ratio characteristic of the charge forming apparatus. Thus the provision of means for selecting the reference pressure of the regulator provides means for adjusting the air-fuel ratio of the charge forming apparatus.

Turning now to FIG. 3, there is shown an alternate embodiment of the regulator in which a remotely controlled transducer is employed for selecting the reference pressure in control chamber 66. The transducer is in the form of a permanent magnet iron ring 83 mounted in body 51 and wound wire coil 84 engaging diaphragm 76. Such transducers have the property of exerting a force related to electrical current flowing in the coil which force is substantially independent of the position or displacement of the coil. A control circuit for controlling the current applied to coil 84 is indicated schematically as follows. An electronic control module 101 receives power from a storage battery 102 and receives an electrical signal through the terminals 103, 104 indicative of a monitored condition. The control module 101 supplies an electrical output to terminals 106, 107 and coil 84 indicative of the monitored condition which results in variation of the reference pressure of the regulator and hence in variation of the air-fuel ratio of the charge forming apparatus. It may be desirable to monitor one or more of several conditions such as engine temperature, atmospheric pressure or engine exhaust emissions. For example, the exhaust system 108 may include an exhaust gas sensor 109 which provides a signal indicative of the oxygen in the engine exhaust. Where such an exhaust gas sensor is used, if the engine is running too rich, the oxygen content of the exhaust will be reduced and conversely if the engine is running too lean the oxygen content of the exhaust will be increased. The rich and lean signals from the exhaust gas sensor are supplied to control module 101 which regulates the reference pressure in the regulator in order to modify the fuel dispersion rate of the charge forming apparatus. By continuously modifying the fuel dispersion rate of the charge forming apparatus in accordance with engine operating parameters such as the oxygen content of the exhaust, it is possible to operate an engine near the optimum conditions for fuel economy and low emissions.

An alternate embodiment of the pressure regulator means is shown in FIG. 4. In the embodiment of FIG. 4, the closure member 86 includes a control port 87 which cooperates with a tapered stem 88 mounted on diaphragm 76 for regulating flow rate into control chamber 66 from lower cavity 74.

The foregoing description refers to preferred embodiments of the invention, which embodiments may be modified within the scope of the following claims.

What is claimed is:

1. In a fuel system including a fuel source, and charge forming apparatus arranged for recirculating excess fuel; a regulator comprising a body receiving a movable control spool; said body including a supply port adapted for connection to said fuel source, an outlet port, and a return port adapted for connection to said charge forming apparatus for receiving excess fuel therefrom; each of said ports communicating with said control spool; said spool including fluid throttling means for variably restricting flow from said return port to said outlet port in response to movement of said spool; a control chamber operatively connected with said control spool for controlling movement of said spool in accordance with pressure difference between said return port and said control chamber; pressure regulator means connected between said control chamber and said return port for charging said control chamber with fluid from said return port; and restricting means connected between said control chamber and said outlet port for exhausting fluid from said control chamber; said pressure regulator means and restricting means maintaining a selected reference pressure in said control chamber whereby said control spool regulates flow from said return port to adjust the pressure of recirculated fuel toward the value of said reference pressure.

2. A regulator according to claim 1, having manual reference pressure selection means mounted on said body operatively connected with said pressure regulator means.

3. A regulator according to claim 1, having transducer means operatively connected to said pressure regulator means, and control means connected to said transducer means for varying said selected reference pressure in accordance with a monitored condition.

4. A regulator according to claim 3, wherein said transducer means comprises an electromagnetic device, and said control means includes electronic circuitry effective to vary said selected reference pressure in accordance with the oxygen content of the exhaust from an internal combustion engine.

5. A regulator according to claim 1, wherein said body includes an elongated bore slidably receiving said control spool, said return port communicating with said spool adjacent one end of said bore, said control chamber being defined in the opposite end portion of said bore, said body further including an elongated passage extending substantially parallel to said bore connecting said return port to said pressure regulator means.

6. A regulator according to claim 5, wherein said restricting means includes a passage and orifice defined within said control spool communicating said control chamber with said outlet port, said outlet port communicating with said spool between said control chamber and said one end of said bore.

7. A regulator according to claim 1, wherein said body includes a bore receiving said control spool, said control spool being provided with anti-friction surface engaging said bore.

8. A regulator according to claim 1, wherein a pressure regulator means includes a diaphragm arranged for controlling opening of said control port, said body including passage means communicating said return port with said diaphragm for urging said diaphragm in opening direction in response to pressure increase in said return port.

9. A regulator according to claim 1, wherein a pressure regulator means includes a diaphragm arranged for controlling the opening of said control port, and biasing means arranged for urging said diaphragm toward a position closing said control port, the force exerted by said biasing means on said diaphragm being substantially independent of deflection of said diaphragm.

* * * * *

UNITED STATES PATENT OFFICE
CERTIFICATE OF CORRECTION

PATENT NO. : 3,977,382
DATED : August 31, 1976
INVENTOR(S) : John J. Tuzson and Irving H. Hallberg It is certified that error appears in the above-identified patent and that said Letters Patent are hereby corrected as shown below:

Column 6, line 53, after "wherein" cancel "a" and insert -- said --.

Column 6, line 55, cancel "said" (first occurrence) and insert -- a --.

Column 6, line 60, after "wherein" cancel "a" and insert -- said --.

Column 6, line 62, cancel "said" and insert -- a --.

Signed and Sealed this

Second Day of November 1976

[SEAL]

Attest:

RUTH C. MASON
*Attesting Officer*

C. MARSHALL DANN
*Commissioner of Patents and Trademarks*